(12) United States Patent
Ito et al.

(10) Patent No.: US 6,182,543 B1
(45) Date of Patent: *Feb. 6, 2001

(54) BAR LOADER

(75) Inventors: Takazo Ito, Hachioji; Kenji Sato, Yachiyo; Kazuhiko Takeoka, Yashio, all of (JP)

(73) Assignee: Ikuraseiki Seisakusho Co., Ltd., Shimodate (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/874,908

(22) Filed: Jun. 16, 1997

(30) Foreign Application Priority Data

Jun. 18, 1996 (JP) .................................... 8-157204

(51) Int. Cl.[7] .................................... B23B 13/10
(52) U.S. Cl. ........................... 82/127; 82/125; 82/126; 414/15
(58) Field of Search ............... 82/125, 126, 127, 82/163, 162, 901; 414/15, 17, 18; 407/11

(56) References Cited

U.S. PATENT DOCUMENTS

| | | | |
|---|---|---|---|
| 4,577,536 | * 3/1986 | Lechot et al. | 82/126 |
| 4,679,659 | * 7/1987 | Jendick | 184/15.2 |
| 4,889,024 | * 12/1989 | Geiser et al. | 82/126 X |
| 4,977,801 | * 12/1990 | Fabbri | 82/127 |
| 5,146,819 | * 9/1992 | Geiser et al. | 82/126 X |
| 5,505,584 | * 4/1996 | Berns | 82/125 X |
| 5,642,650 | * 7/1997 | Roote et al. | 82/126 |

FOREIGN PATENT DOCUMENTS

| | | |
|---|---|---|
| 57-194802 | 11/1982 | (JP) . |
| 60-71102 | 4/1985 | (JP) . |
| 60-66402 | 5/1985 | (JP) . |
| 63-216650 | 9/1988 | (JP) . |
| 63-278704 | 11/1988 | (JP) . |
| 63-295147 | 12/1988 | (JP) . |

* cited by examiner

Primary Examiner—Henry W. H. Tsai
(74) Attorney, Agent, or Firm—Pillsbury Madison & Sutro LLP

(57) ABSTRACT

A bar loder, includes a guide rail for feeding a bar to a bar machining apparatus. The guide rail extends straight toward the bar machining apparatus and has an opening for receiving a new bar. The opening is oriented upwardly and extends longitudinally along the guide rail. An oil outlet is provided for feeding oil into the guide rail, with an amount of the oil being enough to coat a peripheral surface of the bar.

10 Claims, 2 Drawing Sheets

BAR LOADER

BACKGROUND OF THE INVENTION

The present invention relates to an automatic bar loader which feeds a bar to a bar machining apparatus such as a NC lathe or the like.

DESCRIPTION OF THE PRIOR ART

An automatic bar loader for feeding an elongated bar automatically to a bar machining apparatus such as a NC lathe or the like has been known. Such a bar machining apparatus machines the leading end of the bar. The bar loader has a guide rail which extends straight toward the bar machining apparatus and the bar to be machined is fed to the bar machining apparatus therein. A trailing end of the bar is held by a finger chuck that is provided at a leading end of the feeding rod. A leading end of the bar is held by a collet chuck provided in the bar machining apparatus. The bar is fed to the bar machining apparatus by forward and rearward movement of the feeding rod within the guide rail. The guide rail has a channel-like shape and has an elongated opening oriented upwardly over its length. After a bite provided in the bar machining apparatus separates the last product from the bar, a remainder bar piece is discharged from the apparatus. Then, a new bar is taken out of a stock rack provided next to the guide rail and is fed into the guide rail through the opening.

As stated above, the bar is held by the finger chuck at the trailing end thereof within the guide rail and it is held by the collet chuck of the bar machining apparatus at the leading end thereof. Therefore, the middle portion thereof deflects because of its own weight, especially when the bar to be machined is slender. Due to the deflection, or due to the shape of the bar that is originally bent, the peripheral surface of the bar makes contact with an inner surface of the guide rail. During machining operations, the bar is rotated at a high speed within the guide rail. Therefore, contact between the bar and the inner surface of the guide rail causes vibration and noise.

Conventionally, a so-called "oil type" bar loader which is constructed in such a way to decrease the vibration and noise during machining operations has been known. In this conventional apparatus, the vibration of the bar is suppressed by preventing the bar from making contact with the guide rail. That is, in this type of bar loader, a new bar is supplied to the guide rail through the elongated opening and the elongated opening is sealingly closed by a lid. Then, the space between the bar and the inner surface of the guide rail is filled with oil. The bar is positioned at the center of the guide rail by a fluid mechanical centripetal action caused by the rotation of the bar in the oil.

However, in the above oil-type bar loader, it is necessary to have a highly sealed structure so that the oil does not leak outside of the guide rail during the rotation of the bar. Especially, in the type of bar loaders which control the movement of the feeding rod by changing the oil pressure, it must be constructed so that the pressurized oil does not leak. Such a sealed structure needs accurately formed parts which are sealingly engageable with each other, and also an intricate mechanism for opening and closing the lid. Therefore, the complex structure of the apparatus causes manufacturing costs to increase.

Further, to meet the demand in the industry requiring unmanned operations, it is desirable that the bar loader Is constructed to be automatically operable.

SUMMARY OF THE INVENTION

It is, therefore, an object of the present invention to provide a bar loader having a simple structure which can solve the vibration and noise problem of the bar.

It is, a further object of the present invention to provide an unmanned bar loader which can solve the vibration and noise problem of the bar.

The present invention attains the above objects of the present invention based on an idea that is completely different from the conventional one which utilizes a complex structure with a guide rail filled with oil in which the bar is positioned at the center of the guide rail by a fluid mechanical centripetal action when the bar is rotated. The inventor of the present invention realized that the cause of the noise and vibration was that when the bar rotates, it rolls upwardly along the inner surface of the guide rail due to the friction generated when the inner surface of the guide rail comes in contact with the peripheral surface of the bar. When the bar reaches to a certain point, it falls due to its weight and hits the bottom surface of the guide rail. The repetition of this action causes the vibration and the noise. The present invention solves the objects by a bar loader having a simple structure. Further more, the present invention achieves the object by an automatically operable apparatus to meet the demand in the industry requiring unmanned operations.

A bar loader according to the present invention comprises: a guide rail for feeding a bar to a bar machining apparatus which extends straight toward the bar machining apparatus and has an opening for receiving a new bar, said opening being oriented upwardly and extending longitudinally along the guide rail; and oil feeding means for feeding oil into said guide rail, an amount of said oil being enough to coat a peripheral surface of the bar.

In a preferred aspect of the present invention, the bar loader further comprises a lid for covering said opening.

In a further preferred aspect of the present invention, the bar loader further comprises: a stock rack provided parallel to and by the side of said guide rail, said stock rack holding a plurality of bars to be fed into said guide rail parallel to said opening; an index disk arranged substantially perpendicular to said opening of said guide rail and said bars on said stock rack, said index disk having at least one pocket at its circumference for receiving one of said bars held on said stock rack, and said index disk being rotatable between a first angular position for receiving said bar into said pocket and a second angular position for feeding said bar received in said pocket into said guide rail; and driving means for rotating said index disk, and wherein said lid is moved by said driving means so that said opening of said guide rail is opened when said index disk is in said second angular position.

In a still further preferred aspect of the present invention, the bar loader further comprises: a stock rack provided parallel to and by the side of said guide rail, said stock rack holding a plurality of bars to be fed to said guide rail; and a bar taking out mechanism for taking out a bar from said stock rack and feeding said bar into said guide rail; and a cover for preventing oil scattering which surrounds said guide rail, said stock rack and said bar taking out mechanism.

In a still further preferred aspect of the present invention, said oil feeding means having an oil outlet for feeding oil into said guide rail, and the bar loader further comprises: detecting means for detecting a location of said feeding rod within said guide rail; and means for controlling to feed the oil from said oil outlet into said guide rail when it determines that said feeding rod is located behind said oil feeding outlet based on the detected result by said detecting means.

In a still further preferred aspect of the present invention, said oil feeding means has a plurality of oil feeding outlets provided along said guide rail at a distance from each other, and said controlling means determines a middle portion of said bar based on the detected result by said detecting means and feeds the oil into said guide rail from said oil feeding outlet located closer to said middle portion of said bar.

In a still further preferred aspect of the present invention, the bar loader further comprises an oil absorber provided on the forward side of said guide rail, said oil absorber being in contact with a peripheral surface of said bar fed toward said bar machining apparatus.

The above and other objects and features of the present invention will become apparent from the following detailed description, taken in conjunction with the accompanying drawings which illustrate, by way of example, the principles of the present invention.

DESCRIPTION OF THE PREFERRED EMBODIMENTS

Figure 1:
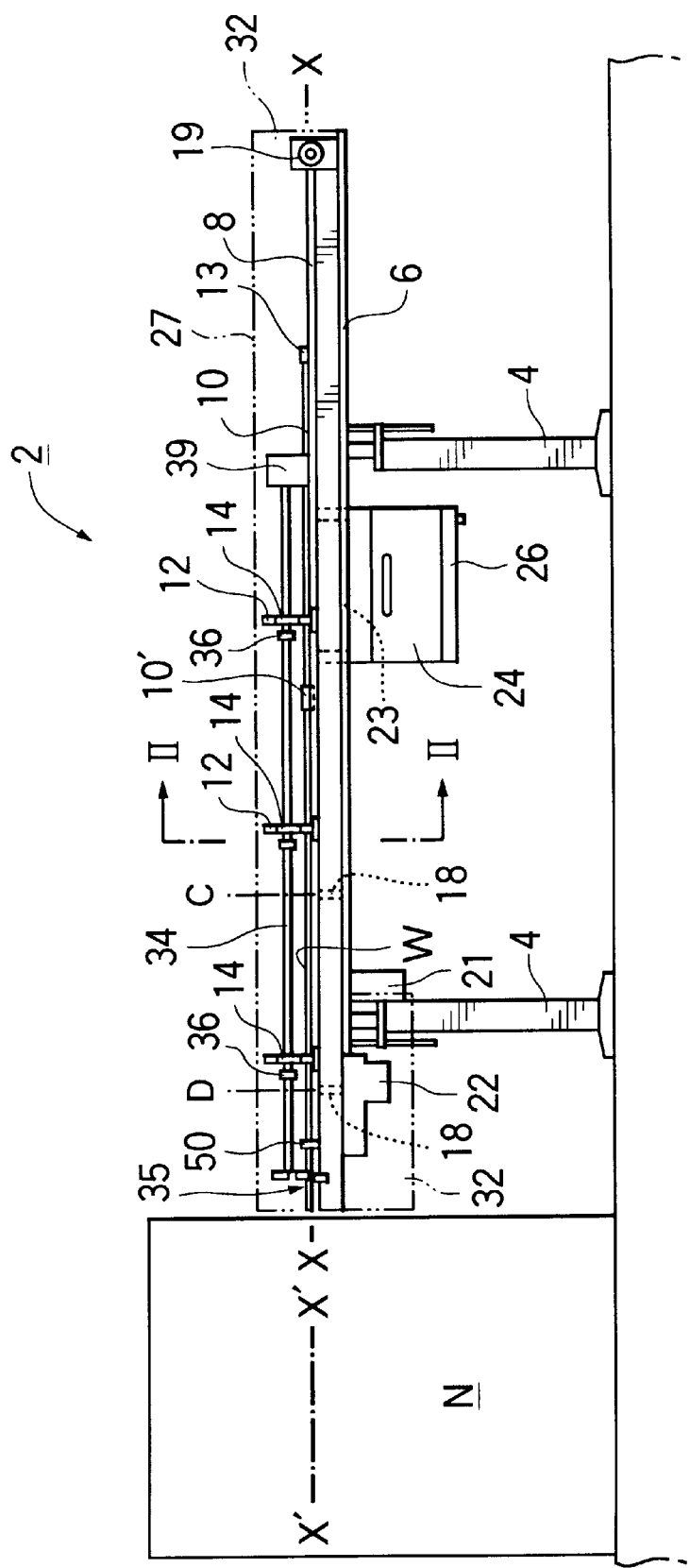
FIG. 1 is a schematic side view of a bar loader in accordance with the preferred embodiment of the present invention where an outer cover for preventing oil scattering is indicated by dotted lines to show the guide rail of the bar loader clearly.
Figure 2:
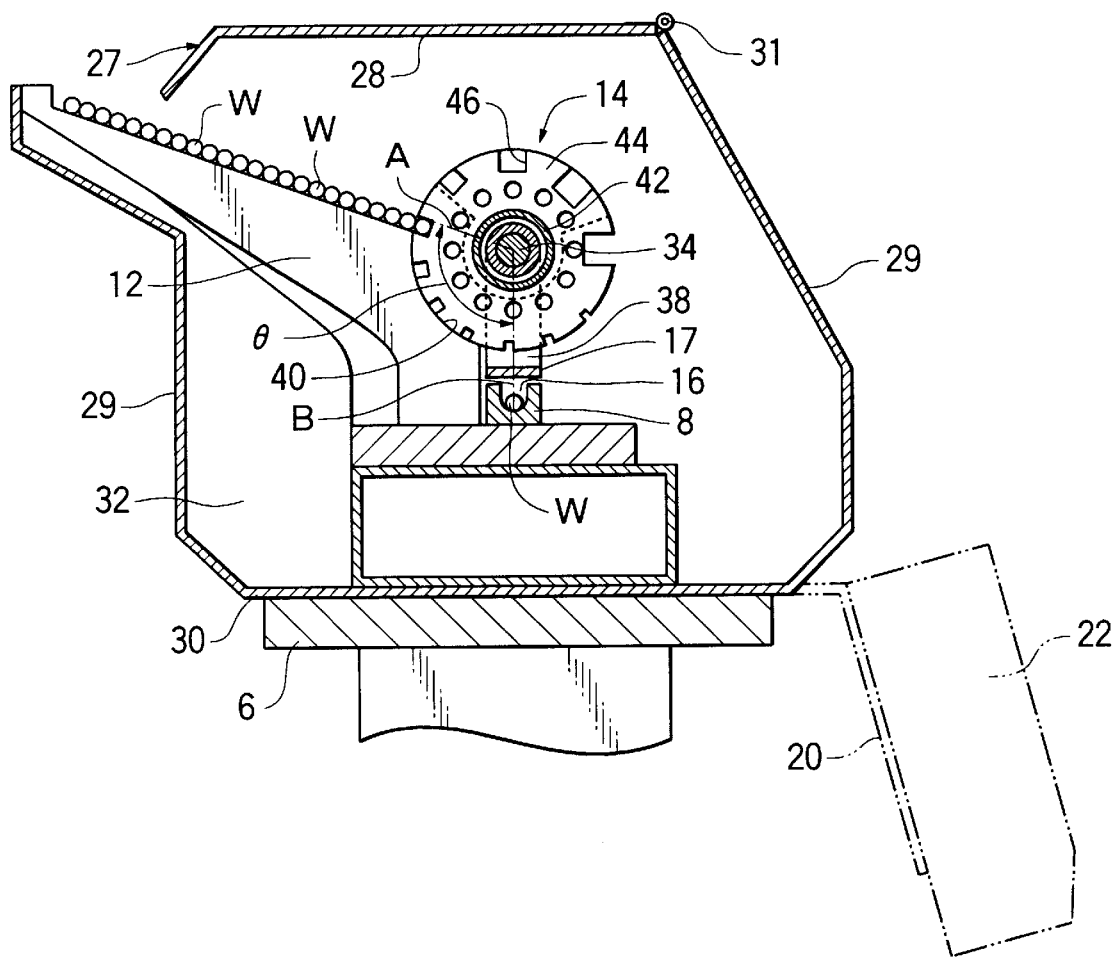
FIG. 2 is a cross sectional view of the bar loader taken along the line II—II shown In FIG. 1.

As shown in FIG. 1, a bar loader 2 in accordance with the preferred embodiment is placed by the side of a NC lathe N. The bar loader 2 is comprised of a base 6 which is supported by front and rear stands 4. A guide rail 8 for feeding a bar W to the NC lathe N is supported on the base 6. The guide rail 8 of the bar loader 2 extends rearwardly from the NC lathe N. The guide rail 8 has a feeding rod 10 therein that is retracted to a rear end position in the guide rail 8 while a bar (a new bar) W is taken out of a stock rack 12 and is supplied to the guide rail 8. The feeding rod 10 is provided with a finger chuck 10' for holding the trailing end of the bar W. A longitudinal axis X—X of the guide rail 8 is coaxially aligned with a machining axis X'—X' of the NC lathe N. As shown in FIGS. 1 and 2, the stock rack 12 for holding a plurality of bars W is mounted parallel to the guide rail 8. Further, the bar loader 2 is provided with a rotatable shaft 34 which is located above the guide rail 8 and parallel to the axis X—X thereof. The bars W placed on the stock rack 12 are taken out therefrom by three index disks 14 mounted on the rotatable shaft 34 as shown in FIG. 1. Each of the index disks 14 is attached to the rotatable shaft 34 perpendicular thereto. The rotatable shaft 34 extends through a plurality of brackets 36 fixed to the base 6 and is rotatably supported by bearings mounted on the brackets 36.

The guide rail 8 has a channel like shape and has an elongated opening 16 over the length oriented upwardly. The bar W taken out of the stock rack 12 is received into the guide rail 8 through the elongated opening 16. The guide rail 8 has a U-shaped inner surface as viewed in FIG. 2. The inner surface is coated with an urethane film so as to avoid direct contact between the inner surface of the guide rail 8 and the bar W to prevent the noise problem. FIG. 2 also shows that a peripheral surface of the middle portion of the bar W is In contact with the bottom inner surface of the guide rail 8. The bar W is supported by the finger chuck 10' at its trailing end and by a vibration suppresser 35 at its leading end and therefore, the middle portion thereof deflects and makes contact with the inner surface of the guide rail 8. The elongated opening 16 is covered with a lid 17 extending over the length thereof during the machining operations of the bar W.

The feeding rod 10 is provided in the guide rail 8 and moves forwardly and backward therein to feed the bar W to the NC lathe N. A so-called "wing" 13 is provided at the trailing end of the feeding rod 10 and extends horizontally and perpendicular to the axis X—X. As shown in FIG. 2, a gap is formed between the guide rail 8 and the lid 17 to allow the wing 13 of the feeding rod 10 to extend therethrough and to move along the guide rail 8. The wing 13 is connected to a feeding rod driving mechanism (not shown). The feeding rod driving mechanism is comprised of an endless chain, a pair of sprockets, and a driving motor (not shown). The wing 13 of the feeding rod 10 is attached to the endless chain, and the endless chain runs along the sprockets and at least one of the sprockets is coupled with an output shaft of the driving motor.

An encoder 19 is provided near the rear end of the guide rail 8. When the finger chuck 10' provided at the leading end of the feeding rod 10 moves within the guide rail 8, pulse signals that correspond to its distance moved are transmitted to a controller 21. The controller 21 counts the number of pulses to detect the location of the finger chuck 10' within the guide rail 8.

The guide rail 8 is provided with two oil outlets 18 at the locations "C" and "D" in FIG. 1. The oil outlets 18 are located above the bar W in the guide rail 8 as viewed the cross section thereof. An oil tank 22 is fixed to the lower side of the base 6 by means of a bracket 20 near the NC lathe N. The oil tank 22 and the oil outlets 18 are connected with a tube (not shown) via a selector valve (not shown) controlled by the controller 21. Further, the guide rail 8 is provided with a discharging port 23 for discharging remainder bars and a collecting box 24 is mounted under the discharging port 23 to collect remainder bars. An oil collecting container 26 for collecting the oil dripped from the surface of the remainder bars in the collecting box 24 is provided below the collecting box 24.

Figure 3:
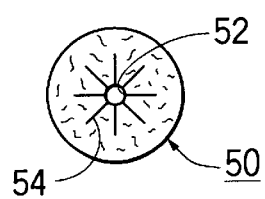
FIG. 3 is a schematic front view of an oil absorber.

As shown in FIG. 1, an oil absorber 50 is provided at the forward end of the guide rail 8. As shown in FIG. 3, the oil absorber 50 has a circular shape having a through hole 52 at the center thereof. The diameter of the hole 52 is slightly smaller than that of the bar. A plurality of cut lines 54 extending radially from the center of the hole 52 are formed in the absorber 50 to allow the bar to go through the hole 52. The oil absorber 50 is attached to the base 6 by means of a bracket so that the center of the hole 52 is coaxially aligned with the longitudinal axis X—X.

Further more, as shown in FIG. 1, a vibration suppressor 35 for suppressing vibration of the bar W is provided at a location in front of the oil absorber 50 of the guide rail 8. The vibration suppressor 35 holds the bar W by four rollers at the location between the collet chuck of the NC lathe N which holds the leading end of the bar W and the finger chuck 10' which holds the trailing end of the bar and holds it. It serves to suppress the vibration of the bar during the machining operations of the bar. The four rollers are pressed against the circumferential surface of the bar W to an extent which allow the forward and rearward movements of the bar W in accordance with the movement of a headstock of the NC lathe N.

As shown in FIG. 2, the guide rail 8, the stock rack 12 and the index disks 14 are entirely surrounded by a cover 27 for preventing oil scattering. It prevents the oil from scattering outside to the environment through the slit between the guide rail 8 and the lid 17. The cover 27 has a top plate 28, side plates 29, a bottom plate 30, and end plates 32. The side plates 29 and the bottom plate 30 are integrally connected to each other. One of the side plates 29 and the top plate 28 are connected by means of a hinge 31 so that the top plate 28 can be opened for the purpose of, for example, its maintenance. Further, between the top plate 28 and the side plate 29 on the side of stock rack 12 a longitudinally extended opening for receiving a new bar to the stock rack 12 while the top plate 28 is closed is formed.

Further, with reference to FIG. 2, the stock rack 12, the index disks 14, the guide rail 8, and the lid 17 shall be explained in more detail. As illustrated in FIG. 2, the stock rack 12 which holds a plurality of new bars to be supplied to the guide rail 8 is arranged parallel to and by the side of the guide rail 8. The stock rack 12 has an arcuate surface 40 that cooperates with the circumference of the circular index disk 14. Each index disk 14 is comprised of a boss 42 and a circular plate 44, each of which being coaxially attached to the rotatable shaft 34. Each index disk 14 is releasably locked to the shaft 34. A plurality of square pockets 46 are formed along the circumference of the rotatable circular plate 44 to be equally spaced from each other. Each pocket 46 has different width and depth which correspond to different diameters or thicknesses of the bars W. The various shapes of the bars W having different diameters or thicknesses are received into a corresponding pocket 46 and are taken out from the stock rack 12.

Further, the lid 17 is for covering the elongated opening 16 of the guide rail 8 to prevent oil scattering therefrom. It is attached to the rotatable shaft 34 by a pair of supporting arms 38, each of which is located at the forward end or rearward end of the guide rail 8. The rotatable shaft 34 is connected to an output shaft of a motor 39 at its rear end and therefore, the index disks 14 and the lid 17 are moved by the single motor 39. Preferably, the motor 39 is a servo motor whose angular positions are controllable.

The bar loader 2 functions as follows. The feeding rod 10 is initially retracted to the rear most end of the guide rail 8. Before starting an operation of the bar loader 2, an operator selects a pocket 46 having a size which corresponds to the diameter of the bar to be machined held on the stock rack 12, and unlocks the index disk 14 from the rotatable shaft 34. Then, the operator turns the index disks 14 until the selected pocket 46 is positioned at an angular position A in FIG. 2 (hereinafter, a "first angular position A"), and again, locks the index disks 14 to the rotatable shaft 44. The arms 38 for supporting the lid 17 are disposed so that they are suspended from the shaft 34 and aligned with the guide rail 8 when the index disks 14 are positioned at the first angular position A. That is, when the pocket 46 is positioned at the first angular position A where the bar W on the stock rack 12 is received, the lid 17 covers the elongated opening 16 of the guide rail 8. The shaft 34 is rotated by the motor 39 through an angle $\theta$ in a counterclockwise direction. The index disks 14 are rotated to an angular position B in FIG. 2 where the bar W in the pocket 46 can be fed into the guide rail 8 (hereinafter, a "second angular position B"). When the index disks 14 are rotated by the shaft 34, the lid 17 is also rotated thereby through the angle $\theta$ in the counterclockwise direction to open the elongated opening of the guide rail 8. The bar W received in the pocket 46 is moved downwardly along the arcuate surface 40 of the stock rack 12 to the location above the guide rail 8 by the rotation of the index disks 14. Then, the bar W falls into the guide rail 8 through the elongated opening 16 at the second angular position B. Subsequently, the shaft 34 is rotated through the angle $\theta$ in a clockwise direction (a reverse direction) by the motor 39 to rotate the lid 17 through the angle $\theta$ in the clockwise direction (the reverse direction) so as to cover the elongated opening 16 of the guide rail 8. The index disks 14 rotated through the angle of $\theta$ receive a new bar W into the pocket 46 of each index disk 14 from the stock rack 12.

A pusher (not shown) then pushes the rear end of the bar W in the guide rail 8 toward the NC lathe N. The bar W is moved forwardly in the guide rail 8 and the leading end thereof is held by a clamp device of the NC lathe N. Then, the feeding rod 10 that is at the rear end position of the guide rail 8 is moved forwardly by the endless chain attached to the wing 13 of the feeding rod 10 and stops at a predetermined location. Then, the cramp device moves rearwardly to insert the bar into the finger chuck 10' provided at the leading end of the feeding rod 10. The feeding rod 10 is driven by the endless chain and moves within the guide rail 8 in a reciprocal motion moving the bar W toward or away from the NC lathe N.

When the feeding rod 10 moves forwardly within the guide rail 8, the encoder 19 transmits pulse signals which correspond to the movement of the finger chuck 10' of the feeding rod 10 to the controller 21. The controller 21 counts the number of pulse signals to detect the location of the finger chuck 10' within the guide rail 8. The controller 21 calculates the location of a middle portion of the bar W (i.e., the location where the bar W deflects most and is in contact with the inner surface of the guide rail 8) based on the counted number of pulses and the predetermined distance between the finger chuck 10 and the collet chuck of the NC lathe N. The controller 21 then selects one of two oil outlets 18, "C" or "D" in FIG. 1 that is closer to the middle portion of the bar W. Further, the controller 21 opens the selector valve (not shown) of the oil outlet 18 that is selected and the oil is fed from the oil outlet 18 into the guide rail 8. An appropriate amount of oil to be fed in each oil feeding operation is approximately 5 cc to 10 cc and it is trickled in the form of droplets from above the bar W.

The finger chuck 10' at the leading end of the feeding rod 10 is rotatably attached to a body thereof via a joint. The bar W is fed toward the NC lathe N while it is rotated about the joint. The oil fed into the guide rail 8 is coated on the peripheral surface of the bar W which is in contact with an inner surface of the guide rail 8 by the rotation thereof. Further, a little amount of oil that leaks through the gap between the guide rail 8 and the lid 17 is collected by the cover 27 and is returned to the oil tank 22 via a tube for reuse.

Further, the bar W is fed forwardly toward the NC lathe N by the feeding rod 10. When the bar W passes through the hole 52 of the oil absorber 50 made of felt material provided near the forward end of the guide rail 8, the excess oil coated on the peripheral surface of the bar W is absorbed thereby. When the oil absorber 50 is saturated with the oil, the oil drips down therefrom and is collected by the cover 27 and is returned to the oil tank 22 via a tube for reuse.

The vibration suppresser 35 holds the bar W between the leading end thereof held by the collet chuck of the NC lathe N and the rear end thereof held by the finger chuck 10' to prevent the vibration of the bar W.

When the length of the bar left after the machining of the bar W by the NC lathe N Is short, the remainder bar Is brought back to the bar loader 2 by the feeding rod 10 to dispose it through the discharging port 23. It is collected in the collecting box 24. The oil coated on the peripheral surface of the remainder bars drips down into the oil collecting container 26 provided below the collecting box 24.

In accordance with the embodiment of the present invention, since the oil is trickled in the form of droplets from above the bar W a little by little, the oil is maintained between the peripheral surface of the bar W and the inner surface of the guide rail 8 even if some oil scatters to the outside of the guide rail 8 by rotation of the bar.

Further, according to the embodiment, the inner surface of the guide rail is coated with urethane coating. Therefore, damage to the bar W caused by the contact between the bar and the inner surface of the guide rail can be prevented by cushioning action of the urethane coating. On the other hand, the urethane coating has a relatively large coefficient of friction. By feeding the oil into the guide rail, the friction between the bar and the urethane coating can be decreased and thus it can prevent the bar from rolling up along the inner surface of the guide rail. Thus, the problems of the vibration and the noise caused by the bar hitting on the bottom surface of the guide rail can be solved. Since the urethane coating does not absorb the oil, only a small amount of oil is needed to form an oil film between the bar and the inner surface of the guide rail.

Further more, in accordance with the embodiment, since the peripheral surface of the bar is coated with the oil, wear of the rollers of the vibration suppressor due to the forward and rearward movement of the bar W among the rollers can be minimized.

Further, in accordance with the embodiment, since the oil is fed into the guide rail, the rotatable joint of the finger chuck can be also lubricated, and therefore, a separate lubricating operation thereof can be eliminated.

Further, in accordance with the embodiment, the excess oil on the peripheral surface of the bar is absorbed by the oil absorber. Therefore, the oil scattering in the vicinity of the NC lathe N can be prevented. In addition, since the oil is collected in the oil tank for reuse, it serves to save some oil.

Further more, according to the above embodiment, the scattering of the oil due to the rotation of the bar can be minimized by means of a simple structure such as a lid. Since the amount of oil fed is just enough to coat the peripheral surface of the bar, it is not necessary to sealingly close the elongated opening of the guide rail and the objects of the present invention can be achieved with a simple structure.

Further, according to the above embodiment, since the index disks and the lid are driven by the single motor, the movement of the index disk and the movement of the lid can be easily coordinated.

Further, according to the above embodiment, since it is provided with the cover surrounding the guide rail, the stock rack, and the bar taking out mechanism, the oil scattering to the environment can be prevented and the oil leaked from the guide rail can be collected.

Further, in the above embodiment, since the controller feeds the oil from the oil outlet that is closer to the middle portion of the bar, i.e., the oil can be fed near the portion having the largest deflection. Therefore, the problems of the vibration and the noise can be effectively solved with a minimum amount oil.

The present invention has thus been shown and described with reference to specific embodiments. However, it should be noted that the present invention is in no way limited to the details of the described arrangements but changes and modifications may be made without departing from the scope of the appended claims.

For example, in the above preferred embodiment, although an amount of oil between 5 cc and 10 cc is fed in one oil feeding operation in the form of droplets from the oil outlet located above the bar. Instead, the oil may be trickled in an extremely thin stream therefrom. When the rotational speed is fast and when the bar W has an irregular shape of the cross section other than a circular shape, more amount of oil scatters. Therefore, the oil coating may be maintained by feeding the oil a little by little. Further, alternatively, from 5 cc to 10 cc of oil can be injected toward the bar at once.

Further, although between 5 cc and 10 cc of oil is trickled in the preferred embodiment, the amount thereof may be increased or decreased as needed based on the area where the bar and the guide rail makes contact with each other and the amount of scattering as stated above.

Further more, although the oil is fed toward the bar in the above embodiment, the oil can be fed toward the inner surface of the wall.

Further, in the preferred embodiment, two oil outlets are provided along the guide rail. Because the location where the bar contacts with the inner surface of the guide rail changes depending on where the bar is supported by, for example, the finger chuck, the collet chuck, or the vibration suppressor. Therefore, the number of oil outlets to be provided and the location thereof can be determined depending on where the bar deflects.

Further, in the preferred embodiment, instead of the urethane coating applied on the inner surface of the guide rail, other types of layers such as laminate material, PTFE known under a trade name "Teflon", wax or the like may be used.

Further more, the retracting mechanism of the feeding rod in the above embodiment is the type that retracts the feeding rod to the rear end of the guide rail while a new bar is fed into the guide rail. However, another type of retracting mechanism, for example, that moves the feeding rod to the side of the guide rail can be used.

Further, in the above embodiment, the controller determines the middle portion of the bar. However, alternatively, the controller may determine whether it is behind the oil outlets and may feed the oil into the feeding rod when the feeding rod is behind the oil outlets.

Furthermore, in this specification and the appended claims, the respective means need not necessarily be physical means and arrangements whereby the functions of the respective means are accomplished by software fall within the scope of the present invention.

In addition, the function of a single means may be accomplished by two or more physical means and the functions of two or more means may be accomplished by a single physical means.

According to the present invention, it can provide a bar loader having a simple structure which can solve the vibration and noise problem of the bar.

According to the present invention, it can provide an unmanned bar loader which can solve the vibration and noise problem of the bar.

We claim:

1. A bar loader, comprising:
   a guide rail for feeding a bar to a bar machining apparatus, and extending straight toward the bar machining apparatus, said guide rail having an opening for receiving a new bar, said opening being oriented upwardly and extending longitudinally along the guide rail;

oil delivery means for delivering oil into said guide rail in a trickling manner so that oil disposed in said guide rail is not forced out of said opening by the oil being delivered into said guide rail by said oil delivery means, said oil delivery means comprising an oil outlet for feeding oil into said guide rail;

a feeding rod within said guide rail for feeding the bar toward the bar machining apparatus;

detecting means for detecting a location of said feeding rod within said guide rail; and means responsive to said detecting means for controlling oil delivery to feed the oil from said oil outlet into said guide rail when said feeding rod is located behind said oil outlet.

2. A bar loader in accordance with claim 1, further comprising a lid for covering said opening.

3. A bar loader in accordance with claim 2, further comprising:

a stock rack provided parallel to and by the side of said guide rail, said stock rack holding a plurality of bars to be fed into said guide rail parallel to said opening;

an index disk arranged substantially perpendicular to said opening of said guide rail and said bars on said stock rack, said index disk having at least one pocket at its circumference for receiving one of said bars held on said stock rack, and said index disk being rotatable between a first angular position for receiving said bar into said pocket and a second angular position for feeding said bar received in said pocket into said guide rail; and driving means for rotating said index disk, and whereby said lid is moved by said driving means so that said opening of said guide rail is opened when said index disk is in said second angular position.

4. A bar loader in accordance with claim 1, further comprising:

a stock rack provided parallel to and by the side of said guide rail, said stock rack holding a plurality of bars to be fed to said guide rail; and a bar taking out mechanism for taking out a bar from said stock rack and feeding said bar into said guide rail; and a cover for preventing oil scattering which surrounds said guide rail, said stock rack and said bar taking out mechanism.

5. A bar loader in accordance with claim 2, further comprising:

a stock rack provided parallel to and by the side of said guide rail, said stock rack holding a plurality of bars to be fed to said guide rail; and a bar taking out mechanism for taking out a bar from said stock rack and feeding said bar into said guide rail; and a cover for preventing oil scattering which surrounds said guide rail, said stock rack and said bar taking out mechanism.

6. A bar loader in accordance with claim 1, wherein said oil delivery means has a plurality of oil feeding outlets provided along said guide rail at a distance from each other, and said controlling means determines a middle portion of said bar based on the detected result by said detecting means and feeds the oil into said guide rail from said oil feeding outlet located closer to said middle portion of said bar.

7. A bar loader in accordance with claim 1, further comprising: an oil absorber provided on the forward side of said guide rail, said oil absorber being on contract with a peripheral surface of said bar fed toward said bar machining apparatus.

8. A bar loader in accordance with claim 2, further comprising: an oil absorber provided on the forward side of said guide rail, said oil absorber b being on contract with a peripheral surface of said bar fed toward said bar machining apparatus.

9. A bar loader in accordance with claim 3, further comprising: an oil absorber provided on the forward side of said guide rail, said oil absorber b being on contract with a peripheral surface of said bar fed toward said bar machining apparatus.

10. A bar loader in accordance with claim 4, further comprising: an oil absorber provided on the forward side of said guide rail, said oil absorber b being on contract with a peripheral surface of said bar fed toward said bar machining apparatus.

* * * * *